Aug. 24, 1965          S. D. PORTEUS ETAL          3,201,875
                         EDUCATIONAL DEVICE
Filed Dec. 28, 1962                              2 Sheets-Sheet 1
FIG. 1
FIG. 2
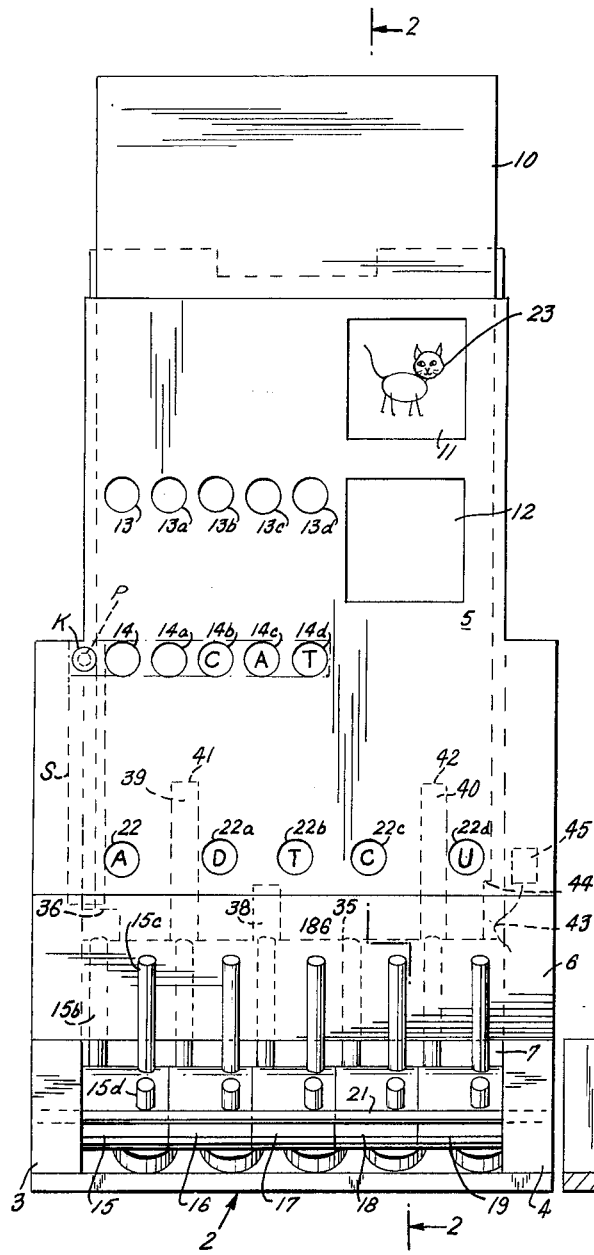
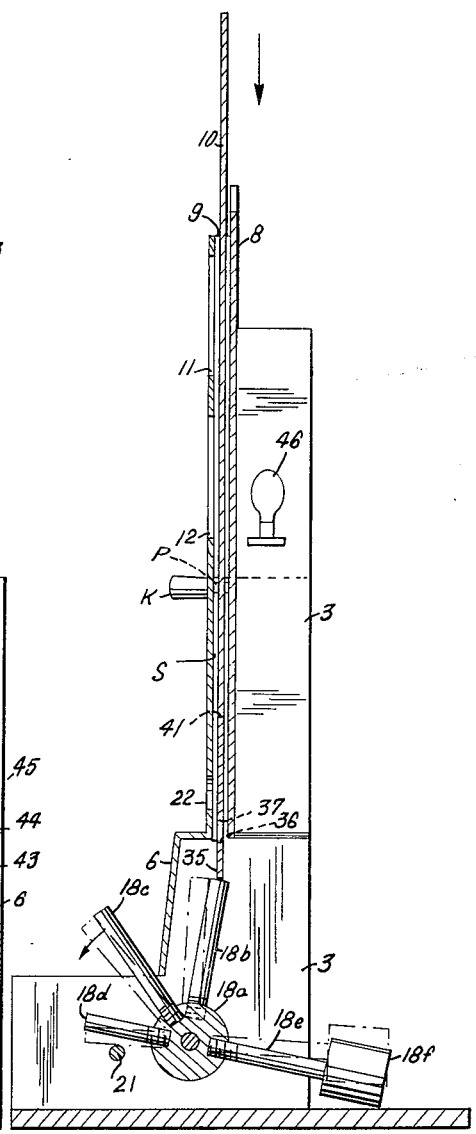
INVENTORS
STANLEY D. PORTEUS
A. LEONARD DIAMOND
BY
Curtis, Morris and Safford
ATTORNEYS Aug. 24, 1965  S. D. PORTEUS ETAL  3,201,875
EDUCATIONAL DEVICE Filed Dec. 28, 1962  2 Sheets-Sheet 2

INVENTORS
STANLEY D. PORTEUS
A. LEONARD DIAMOND

BY

Curtis, Morris and Safford
ATTORNEYS

United States Patent Office 3,201,875
Patented Aug. 24, 1965

3,201,875
EDUCATIONAL DEVICE
Stanley D. Porteus, Honolulu, and Aaron Leonard
Diamond, Kailua, Oahu, Hawaii, assignors to
PHD, Incorporated, Honolulu, Hawaii, a corporation of Hawaii
Filed Dec. 28, 1962, Ser. No. 248,108
8 Claims. (Cl. 35—6)

The present invention relates to educational devices and more particularly to a method of and apparatus for assisting a child in learning to solve particular problems, such as how to spell words.

It is known that many children of pre-school age have the mental capacity to learn how to solve problems such as addition, subtraction or the like, and to spell words. However, most of these children are not taught such subjects because of lack of time, patience or interest of the parent and his lack of knowledge of the way to present the task in properly graded steps, suited to the interests and abilities of the child. Instead of a formal approach to learning such things as spelling, most children are left to play prior to entering school. If, as a part of this play, the child could learn to spell, read and solve other problems, it would enable him to set up useful or essential memory patterns which would in all probability favorably affect his attitude toward learning in school during the entire period of his formal education.

Thus, one of the objects of the present invention is to provide the child with a device having the appeal and inherent interest of an attractive toy and which can be put to work for educational purposes such as learning to spell and read a large number of simple words. The device of the present invention partakes of the nature of all toys in that the child by his own efforts changes in dramatic fashion the appearance or position of the play object. For example, a spherical object is not a toy unless it can be thrown, rolled or caught. This principle is inherent in the method and apparatus of the present invention since the child, by manipulation, changes the appearance of parts in an interesting and meaningful fashion to the child; and with appropriate reward or re-enforcement. By his own efforts, he selects and puts together the sequence of letters to form the name of a pictured object, such as a cat. This is a "painless" operation and, once the memory pattern is firmly established, the child can spell the word.

Another object is to provide an apparatus that is so devised and operates in such a way that it is impossible for the child to make a visible error while operating the machine to spell a particular word. The apparatus, therefore, is analogous to a typing machine that will never reproduce a word that is misspelled. Thus, the child is never discouraged by failure, has nothing to unlearn and nothing happens to expose his ignorance or inability.

Another object is to provide a method of and device for learning which utilizes cards inserted in the apparatus one by one and act in an interlocking relation with manipulated keys to automatically present and arrange for view the letters of the word corresponding to the name of a pictured object. If a wrong key is pressed no visible change in the appearance or position of the device occurs.

Another object is to provide a series of cards for use with the device which are graded in difficulty so as to automatically control the teaching process as well as the learning features of the system.

Still another object is to provide a device of the type indicated which is of simple and compact construction, economical to manufacture and one which is reliable in operation.

These and other objects will become more apparent from the following description and drawings in which like characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a front elevational view of one form of novel apparatus for practicing the method of the present invention;

FIGURE 2 is a transverse sectional view of the apparatus taken on line 2—2 of FIGURE 1 and showing one manually operable key holding a card in one position and operable to release the card for movement to another position;

The method of the present invention is adapted for use in solving other problems, but in the following specification the description of the method and apparatus will be limited to its application for assisting a child in learing how to spell, by way of example. The method, in general, comprises the steps of creating a memory pattern of, for example, an object, its name and the spelling of the name by associating each letter of the name with certain ones of a series of manually operable keys. As the keys corresponding to the letters of the word to be spelled are actuated, the corresponding letters of the word may be observed visually. Furthermore, in accordance with the method of the present invention, the manually operable keys can only be actuated in a particular sequence corresponding to the letters of the word to be spelled. Thus, a child at play with the apparatus will first notice the illustration of an object, such as a cat. As the child actuates the different keys during play he will notice that when the key corresponding to the letter "c" is pushed that the same letter "c" then appears for visual observation. As keys corresponding to the letters "a" and "t" are actuated these letters also appear successively in their proper sequence. As a reenforcement a light may be lighted when the word "cat" has been spelled to illuminate the illustration of the cat and/or the complete word correctly spelled. Such sequences of operation and visual observations produce a memory pattern in assisting the child in learning how the word is spelled.

More specifically, the method is practiced with the aid of an apparatus including in its bare essentials, a board having a window opening and a series of smaller apertures arranged in separate lines and a card having indicia printed thereon for cooperation with the apertures in the board. The card is placed at the rear of the board so that an illustration of an object is positioned in the window and letters on the card are arranged in the apertures in one line in the proper order to spell the word constituting the name of the object illustrated. In addition, the series of manually operable keys are mounted in a line with each having a letter associated therewith and the keys are freely movable for operation by a child at play. The card and keys are interlocked so that the card will be held in one position before any of the keys are operated, and is released for movement to a new position as the key corresponding to the first letter is actuated, and moved to successive new positions as the key corresponding to each successive letter of the word is actuated.

Figure 3:
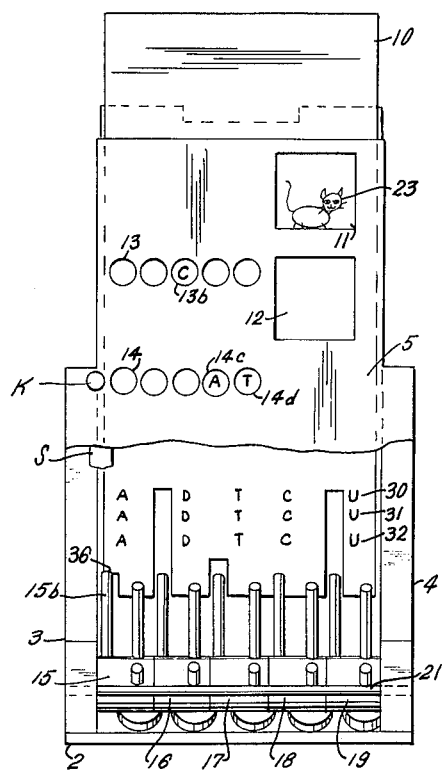
FIGURE 3 is a view similar to FIGURE 1 with a part of the enclosing structure broken away to show the interlocking relationship of the manually operable keys and card for holding the latter in a second position after an increment of movement from the position illustrated in FIGURE 1.
Figure 4:
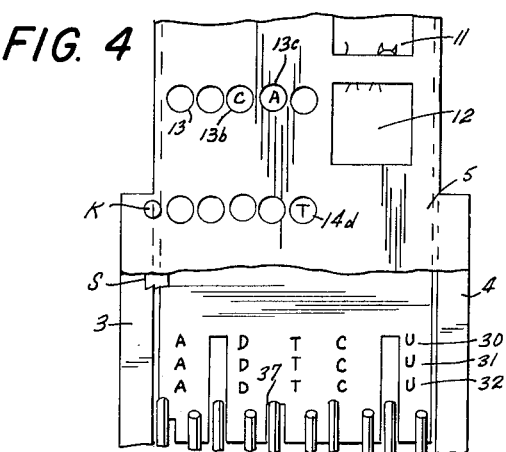
FIGURE 4 is a view similar to FIGURE 3 and showing the card moved to a third position after release by the key corresponding to the next successive character.

As stated above, when the card is first placed in the apparatus an object such as a cat will be observed in the upper window opening and the letters of the word cat will be located in the apertures of, for example, the lower line of apertures. The keys are then operated at random by the child at play. Nothing happens when any of the keys corresponding to the letters a, d, t and u of the series of keys are actuated. However, when the key corresponding to the letter "c" is actuated it releases the card. The card is then slid from a first position to a second position where it engages the locking element of the key corresponding to the letter "a" to limit the movement of the card as shown in FIGURE 3. In this position a letter "c" on the card is located in an aperture in the upper row of apertures and the "c" previously located in the aperture in the lower row of apertures is removed therefrom. Thus, the child visually observes that when the key corresponding to "c" is actuated, the letter "c" disappears from the aperture in the lower and appears in the upper line. The child then continues to operate the keys at random, all of which are freely movable until the key corresponding to the letter "a" is actuated. When this key is actuated it releases the card which is then slid to the next position as illustrated in FIGURE 4. When moved to this position the "a" in the lower row is moved away from its aperture and another "a" is moved into the aperture next to the letter "c" in the upper line. The actuation of the keys continues until the key corresponding to the letter "t" is actuated which releases the card for movement to the position illustrated in FIGURE 5. Movement of the card to this position moves the letter "t" from the lower row of apertures and positions the "t" in the upper row of apertures to complete the spelling of the word. The movement of the card may also be used to actuate a suitable control switch to illuminate the illustration of the cat and spelled word or energize any other suitable element constituting a reward or reenforcement for an accomplishment.

As an alternative, the method may be practiced with a card so inscribed with indicia as to first present only the picture of the cat along with random letters in a row of openings above the keys. After the key for the first letter "c" of the word "cat" has been actuated, the letter "c" appears to jump from just above the key to the first aperture in the upper line of apertures to the left of the picture of the cat and leave a blank space where "c" had appeared just before the key had been actuated. When the key associated with the letter "a" is depressed, the "a" now appears to jump from the lower to the upper line next to the "c" and so on. This method has the advantage of testing the spelling ability of the child after he has learned to spell a word. That is, the child will be presented with only the picture of the cat and then asked to spell out the letters without first seeing the spelling of the word.

The apparatus illustrated in the drawings for performing the method of the present invention comprises a base 2 with upright side plates 3 and 4, a board 5 mounted between the side plates for support by the base, and a closure plate 6 positioned below the board and forming an opening 7 between its lower edge and the base. As shown in FIGURES 1 and 2 a back or guide plate 8 is spaced from the board to form an open slot 9 therebetween.

Interchangeable cards 10 are adapted to be inserted through the open top of the slot 9 and slide freely therein by gravity. As shown in FIGURE 1 the board 5 has window openings 11 and 12 and two rows of apertures 13 and 14. In the illustrated embodiment there are five of such openings 13, 13a, 13b, 13c, 13d and 14, 14a, 14b, 14c and 14d, respectively, but it will be understood that any desired number of letter openings may be provided corresponding to the entire alphabet as well as the numerals 1 to 9 and zero if desired.

A series of five manually operable keys 15, 16, 17, 18, 19, corresponding to the five apertures 13, are provided in the opening 7 between the base 2 and front cover 6. The keys 15 to 19 may be of any suitable form such as push buttons, slides, pivoted elements or the like. In the illustrated embodiment the keys 15 are in the form of rockers with each rocker having a hub with radial pins projecting therefrom. The series of keys 15 to 19 are mounted in side by side relation on a shaft 20 extending between forwardly projecting portions of side plates 3 and 4 of the frame. Each manually operable key 15 to 19 has, for example, a hub 18a, see FIGURE 2, a radially projecting interlocking detent pin 18b projecting upwardly at the rear of the cover plate 6, a forwardly projecting handle pin 18c for manual operation and a stop pin 18d for engaging a cross rod 21 at the front of the keys. In addition, each key 15 to 19 has a rearwardly extending radially extending pin such as 18e mounting a weight 18f at its outer end to rock the key back to its initial position. Pin 18e and weight 18f return the key 18 in a clockwise direction to its normal position after manual actuation and hold the key so as to position the interlocking detent pin 18b under the card; and stop pin 18d and cross rod 21 limit the counterclockwise movement of the key upon manual actuation to the position shown in dotted lines in FIGURE 2. In the illustrated embodiment, each of the five manually operated keys 15 to 19 has a letter associated therewith. To this end, the board 5 has a line of apertures 22, one for each of the keys 15 to 19, through which a letter on the card 10 may be observed. For example, the key 15 has the letter "a," the key 16 has the letter "d," the key 17 the letter "t," the key 18 the letter "c" and the key 19 the letter "u" associated therewith as most clearly illustrated in FIGURE 1. Thus, a child at play will correlate a particular letter with each of the keys 15 to 19.

Figure 6:
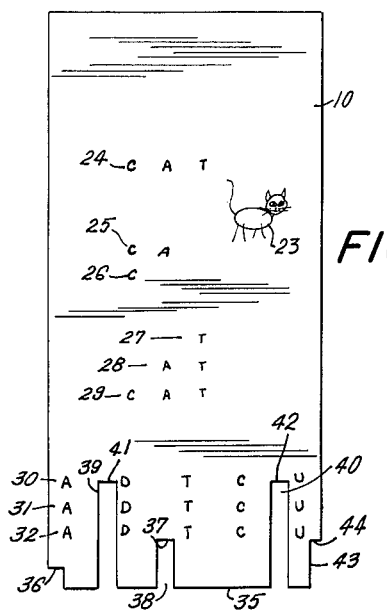
FIGURE 6 is a front elevational view of a card used in the apparatus and showing the ledges at different levels for engagement by the successive manually operable keys and the recesses between the ledges to permit free movement of the keys corresponding to characters not included in the particular problem.

Each card 10 as shown most clearly in FIGURE 6 is of rectangular shape and has an illustration of an object 23, such as a cat, at one side and a plurality of horizontal lines of indicia 24 to 32 thereon with the characters of each line of indicia so spaced as to align with the adjacent apertures 13, 13a, 13b, 13c and 13d. These lines of indicia are divided into three groups of three lines each 24, 25 and 26; 27, 28 and 29, and; 30, 31 and 32 for cooperation with the three lines of apertures 13, 14 and 22, respectively. It will be understood that there are the same number of lines in each of the groups as there are letters in the word to be spelled. For example, if the word to be spelled has four letters there would be three groups of indicia of four lines each. In the illustrated embodiment the word to be spelled has three letters so that the card has three groups of three lines each. The lines of indicia are so spaced that the object 23 is located in the upper opening 11 in the board 5 when the card is first inserted in the slot 9 and is located in the lower opening 12 after the spelling of the word is completed. The upper three lines of indicia 24, 25 and 26 will align with the apertures 13b, 13c and 13d as the card is moved vertically to successive positions. The intermediate three lines of indicia 27, 28 and 29 will align with the apertures 14b, 14c and 14d as the card is moved to its successive positions, and; the lower three lines 30, 31 and 32 will align with the lower line of apertures 22d, 22c and 22d. It will be observed that the horizontal lines 24, 25 and 26 of indicia in the uppermost group all have the letter "c" arranged vertically, the upper two lines have the letter "a" in vertical arrangement and the uppermost line, only, has the letter "t." The intermediate group of lines 27, 28 and 29 have the letter "t" in vertical alignment, the letter "a" is aligned vertically only on lines 28 and 29 while the letter "c" occurs only in line 29. It will be further noted that the upper line 24 is spaced a greater distance from line 25 than the line 25 is spaced from line 26 so that when the word "cat" has been spelled, the object 23 will be centered in the lower panel opening 12 in the board 5. In the lower group of lines 30, 31 and 32 each of the letters a, d, t, c and u are arranged in vertical alignment with the apertures 22 in the board 5.

Card 10 moves by gravity to its successive positions and its movement is controlled by ledges at the lower edge of the card for selectively engaging certain of the interlocking detent pins 15b to 19b of the keys 15 to 19. For example, three ledges 35, 36 and 37 for the letters c, a, and t are provided at successively higher levels, corresponding to the spacing of the lines of indicia 27, 28, 29 and 30, 31 and 32. The ledge 35 is the bottom edge of the card, the ledge 36 for the letter "a" is positioned above the ledge 35 by a cutout portion in the card and the ledge 37 for the letter "t" is at a still higher level at the upper edge of a cutout slot 38. Deep slots 39 and 40 for each of the letters "d" and "u" extend upwardly beyond the ledges 35 to 37 and provides a clearance for the detent pins 16b and 19b and ledges 41 and 42. It will be understood that if a four letter word were to be spelled, the corresponding letters would have four ledges at progressively higher levels in the order of letters of the word to be spelled; and if the word contained five letters, five of the ledges would be provided at progressively higher levels in the sequence of the letters of the word to be spelled.

The card 10 has an additional recess 43 at one edge as also shown in FIGURE 6 and forming a ledge 44 for engaging the actuator of an electric switch 45, see FIGURE 1. The switch 45 may be of any suitable type, but one which is particularly adapted for this purpose is the "micro-switch" which is operated by a small increment of movement or pressure. Switch 45 is electrically connected to a source of power and a device such as an electric lamp 46, see FIGURE 2, which may illuminate a transparency on which the object 23 is illustrated when the word is correctly spelled.

For the purpose of testing the retention in memory of the word patterns sought to be established in the child's mind by the device of the present invention, it has been found desirable to provide a movable shutter to cover the openings 14 in the board 5. Such a shutter may be mounted on the front of the board or in the slot 9. In the illustrated embodiment a shutter S is shown in FIGURES 1 and 2 pivotally mounted on a pin P in the slot 9 and having a knob K projecting forwardly from the board for manual operation by the knob from an inoperative position illustrated in dotted lines to an operative position closing the openings 14 as shown in dot and dash lines in FIGURE 1. In the latter position the shutter S will conceal the word in the openings 14 but leave the picture object in sight in the openings 11 and 12. One form of apparatus now having been described in detail, the mode of operation is next explained.

For purposes of description, let it be assumed that a child playing with the apparatus has selected one of a series of cards having different words to be spelled such as the card illustrated in FIGURE 6 for spelling the word "cat." Let it further be assumed that the card has been inserted into the top of the slot 9 of the apparatus and has slid downwardly by gravity until the ledge 35 coinciding with the lower edge of the card has engaged the interlocking detent pin 18b of the key 18 as shown in FIGURE 2. In this position of the card, the illustration of the cat 23 is located in the window opening 11 of the board, the upper row of apertures 13 is blank, the letters c, a, t appear in the line of apertures 14 and the letters a, d, t, c, u appear in the line of apertures 22 adjacent the keys. Thus, the child may observe the letters c, a, t in the line of apertures 14 and sees the illustration of a cat 23 in the window opening 11.

In playing with the apparatus the child will actuate the various keys at random. For example, the child may actuate the key 15, but this actuation merely rocks the key from one to the other of its two positions with the detent pin 15b moving through the slotted opening underlying the ledge 36 which permits movement without changing the position of the card. The same is true when the child strikes any of the keys 16, 17 or 19. However, when the child strikes the key 18 corresponding to the letter "c" he moves the interlocking detent pin 18b from the full line position to the dotted line position illustrated in FIGURE 2 which releases the card 10. The card 10 then falls by gravity in the slot 9 from the position illustrated in FIGURE 1 to the position illustrated in FIGURE 3 where the ledge 36 engages the detent pin 15b of the key 15 to limit the downward movement of the card. At this new position of the card 10, as illustrated in FIGURE 3, the line of indicia 28 of the intermediate group of lines, see FIGURE 6, including the letters "a" and "t" has moved into alignment with the apertures 14c and 14d, see FIGURE 3. Also the line of indicia 26 of the upper group of lines has moved donwardly into alignment with the line of apertures 13 to position the letter "c" in the apertures 13b. Thus, the child observes that when he strikes the key 18 corresponding to the letter "c" that the letter is removed from the line of apertures 14 and appears in the line of apertures 13. This produces a correlation between striking the key corresponding to the letter "c" and the change in the letter "c" in the lines of apertures 13 and 14.

The child continues to play with the keys and when the key 15 corresponding to the letter "a" is actuated the detent pin 15b is withdrawn from a position underlying the ledge 36 to again release the card which falls by gravity in the slot 9 until the eldge 37 corresponding to the letter "t" engages the stop pin 17b. In this position illustrated in FIGURE 4, the lines of indicia 25 and 27 are moved into alignment with the lines of apertures 13 and 14, respectively, to remove the letter "a" from observation in the line 14 and causing the letter "a" to appear for observation in the line 13. Thus, the child again observes that when the key corresponding to the particular letter "a" is actuated, a change in the letter "a" occurs in both lines of apertures 13 and 14. During each movement of the card a new line of letters 32, 31 and 30 appear in the apertures of the line 22.

Figure 5:
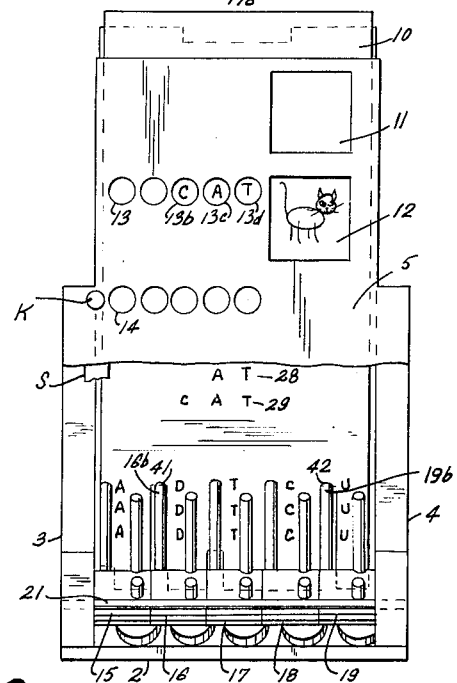
FIGURE 5 is a view similar to FIGURES 3 and 4 and showing the card moved to a fourth position after release by actuation of still another of the manually operable keys corresponding to the next successive character.

Upon further play with the apparatus, the child may actuate the key 17 to again release the card 10 which falls by gravity from the position illustrated in FIGURE 4 to that illustrated in FIGURE 5 where the ledges 41 and 42 at the upper edges of the slots 39 and 40 engage detent pins 16b and 19b, see FIGURE 5. Thus, the card 10 is moved to its lowermost position where the illustration of the cat 23 is aligned in the window opening 12 in the board. The line of indicia 24 then is in alignment with the apertures 13 and blank spaces are positioned at the rear of the line of apertures 14. This completes the spelling of the word "cat" in the apertures of line 13. Thus, the manipulation of the various keys 15 to 19, corresponding to certain letters, causes the letters to appear visually on the board in their proper order.

Furthermore, when the spelling of the word has been completed the ledge 44 at the lower right hand edge of the card, see FIGURE 6, engages and actuates a switch 45 to close a circuit to the electric lamp 46 to illuminate the illustration of the cat. It will be understood that a bell or any other mechanism may be actuated by the closing of switch 45 to produce a reenforcing stimulus. This acts as a reward for completing the spelling of the word which further impresses on the mind of the child the fact that the alignment of the letters c a t in sequential order produces a desirable result and thereby creates a memory pattern in the process of learning how to spell the word.

It will now be observed that the present invention utilizes the motions of a child while at play to assist him in memorizing facts such as word spelling through his own endeavors. It will further be observed that the present invention provides a method of and apparatus for assisting a child to learn by associating an arrangement of characters with individual characters selected at random from a group to create a memory pattern of the characters in proper sequence. It will also be observed that the actuation of any key other than those that present the letters of the word to be spelled in the right sequence will produce no change in the appearance of the apparatus or its visible parts, thus making it impossible for the child to make a visible error in spelling the name of the pictured object and thereby using a most important principle in forming memory patterns. It also will be observed that the present invention provides an improved apparatus for use with selective cards of a group of cards and controlled by a series of manually operable keys to present letters of a word in a predetermined sequence. It will still further be observed that the present invention provides an apparatus of the type indicated which is of simple and compact construction, economical to manufacture and one which is reliable in operation.

While a single embodiment of the invention is herein illustrated and described, it will be understood that changes may be made in the steps of the method and in the elements of the apparatus without departing from the spirit or scope of the invention. Therefore without limitation in this respect, the invention is defined by the following claims.

We claim:

1. A device for assisting a child in learning which comprises a board having a series of apertures arranged in line, a card mounted at the rear of the board for movement relative thereto and having indicia marked thereon, a series of manually actuated keys with each key associated with a particular character of the indicia, selective interlocking means between the card and keys including a member associated with each key and cooperating with a stucture on said card to retain the card in one position and release the card for a predetermined increment of movement when a key is actuated corresponding to the next character of the series to be exposed, and said card presenting a new series of characters in alignment with the series of apertures after each increment of movement.

2. A device for assisting a chlid in learning to spell words comprising a board having a series of small apertures arranged in line, a series of manually operable keys arranged in a line with each key associated with a particular letter, a card mounted at the rear of the board in an upright position and having the letters of the word arranged in successive groups in vertically spaced relation, each manually operable key having a detent underlying the card in one position and movable from under the card to a releasing position, the card having a ledge for each letter of the word to be spelled for engagement by the detent of its corresponding key, and the ledges for successive letters being offset vertically so that the card will be released only when the keys for successive letters of the word are actuated in sequence, and said card moving a distance between successive ledges when released to position successive groups of letters in the series of apertures in the board.

3. A device in accordance with claim 2 in which the board is supported in an upright position and has guides at its sides to mount the card to slide downwardly with respect to the board by gravity.

4. A device in accordance with claim 2 in which a card is provided for each word to be spelled and each card has an arrangement of ledges and slots aligned with the detents of the respective keys to insure selection of the letters of the word to be spelled, one after the other, in proper sequence.

5. A device in accordance with claim 2 in which each manually actuated key is pivotally mounted and rocking movement independently of the other keys and has a forwardly projecting handle, an upwardly projecting detent and a rearwardly extended weighted arm, and means for limiting the rocking movement of each key to position its detent under a corresponding ledge of the card in one position and move the detent from under the ledge in another position.

6. A device in accordance with claim 2 in which the board comprises a window opening, an upper row of spaced apertures, an intermediate row of spaced apertures and a lower row of spaced apertures, and the card having an illustration of an object located in the window opening and horizontal lines of indicia for alignment with the rows of apertures.

7. A device in accordance with claim 6 in which the card has slots adjacent the lower edge thereof to form ledges at different levels above the bottom edge of the card for controlling the increment of movement of the card when released.

8. A device in accordance with claim 7 in which an electric responsive element is provided, an electric switch for controlling operation of the responsive element, and a ledge on the card for actuating the switch when the spelling of a word is completed.

References Cited by the Examiner

UNITED STATES PATENTS

| | | | |
|---|---|---|---|
| 1,351,608 | 8/20 | Barry | 35—6 |
| 3,052,041 | 9/62 | Luxton et al. | 35—9 |
| 3,067,524 | 12/62 | Parker | 35—9 |

JEROME SCHNALL, *Primary Examiner.*

GEORGE A. NINAS, *Examiner.*